Patented Nov. 14, 1950

2,529,784

UNITED STATES PATENT OFFICE 2,529,784

CONDENSATION PRODUCTS OF UREA, MONOALKYL UREA, FORMALDEHYDE, AND MONOHYDRIC ALIPHATIC ALCOHOL

John F. Olin, Grosse Ile, and Paul D. Morton, Wyandotte, Mich., assignors to Sharples Chemicals Inc., a corporation of Delaware No Drawing. Application July 8, 1946, Serial No. 682,156

11 Claims. (Cl. 260—45.2)

The present invention pertains to the manufacture of condensation products by the condensation of urea and urea derivatives with formaldehyde and equivalent methylene-containing bodies to produce resins, or analogous condensation products. Such condensation products may vary in consistency, and may be relatively hard products or relatively viscous liquids or soft solids, all of which will be referred to hereinafter as resinous condensation products. The invention also includes within its scope intermediate products of condensation which are useful in the manufacture of such viscous or solid final products.

This application is a continuation in part of our prior application Serial No. 465,164, filed November 10, 1942, which has matured into Patent No. 2,403,450, granted July 9, 1946.

A particular feature of the invention consists in the fact that it provides a product and process by which the resinous condensation products of the invention may be formed with control, both of the relative hardness of such products and of their solubility in organic solvents.

The invention may be practiced with the aid of small amounts of acids as catalysts, or it may be practiced with the aid of alkaline catalysts. When simple urea is condensed with formaldehyde with the aid of such catalysts, the resulting resinous condensation products are relatively insoluble in organic solvents, unless special expedients to be discussed hereinafter are adopted to render them temporarily soluble. This fact limits the utility of such resinous condensation products in coating compositions and other applications. A further defect of such condensation products consists in the fact that condensation continues to occur slowly after the condensation product is embodied in the finished article of manufacture, such as a coating film or molded product, this continued condensation resulting in the formation of cracks and fissures in the product, and dulling and loss of gloss thereof.

In the prior patent of John F. Olin, 2,273,788, a process is disclosed for condensing formaldehyde with an alkyl urea such as an open chain or cyclo-alkyl urea containing at least four substituent carbon atoms to form resinous condensation products which are soluble in organic solvents in which the products of condensation of simple urea are insoluble, and which are of softer consistency than said prior art products. By adopting the procedure of that patent, a product may be obtained which is soluble in the organic vehicle desired for application of the resin, such as an aromatic hydrocarbon or other organic solvent. This result is accomplished by the simultaneous condensation of the higher alkyl urea (containing at least four substituent alkyl carbon atoms) with the formaldehyde and urea. If the higher alkyl urea is present in sufficient amount, the resulting condensation product will be soluble in the desired solvent. A limitation on the utility of these co-condensation products consists in the fact that the use of the higher alkyl urea to effect the desired solubility of the finished product necessarily entails production of a soft product as compared to the products of condensation of simple urea with formaldehyde. While a certain amount of softness in these products is often desirable, it is frequently necessary, in order to provide a product of the desired solubility, to include a proportion of the higher alkyl urea in the reaction mixture which causes these products to be softer than desired.

Another method which has been employed to render the condensation products of urea and formaldehyde at least temporarily soluble in organic solvents until heat is applied has been to effect at least a part of the condensation reaction in the presence of a monohydric aliphatic alcohol containing 3 or more carbon atoms. By maintaining such an alcohol in the condensation reaction mixture during the course of the condensation, a product is obtained which may be dissolved in the desired organic solvents. After solution in such solvent, and removal of the solvent by the application of heat, the products become insoluble and are thermoset. The use of the aliphatic alcohol in the condensation reaction serves to limit the degree of condensation and alter the product in such a way as to form an intermediate reaction product which can be dissolved in the desired organic solvent vehicle, and the condensation reaction proceeds upon removal of this vehicle by the application of heat in much the same manner as the initial condensation reaction would occur if conducted in the absence of such vehicle.

While the practice of such a process solves the fundamental problem of providing a product which can be dissolved in a liquid vehicle used in its application as a coating, for example, this process has certain serious limitations. The resulting products are subject to certain of the same difficulties encountered in connection with condensation of urea with formaldehyde in the absence of the aliphatic alcohol, in that undesired condensation continues to occur after the solvent is removed, with resultant formation of cracks and fissures, and dulling and loss of gloss. They are also subject to the difficulty that liberation of objectionable fumes of formaldehyde occurs, even after the solvent has been removed. A large degree of polymerization occurs during the course of the thermosetting operation in use of such products, with the result that a considerable loss in the thickness of the applied films is entailed. The product is necessarily limited to a single type with respect to hardness, since the ultimate product after thermosetting is essentially similar to the product of condensation of simple urea with formaldehyde. As a consequence of this fact, it is impossible to control the hardness of the finished product in coatings and other applications to provide varying degrees of softness to correspond to the particular conditions required in the field of application.

Features of the present invention consist in the provision of a process and product by which all of the above disadvantages are avoided. The process and products of the present invention provide features by which the ultimate product can be controlled to obtain varying degrees of hardness and solubility in organic solvents, and thermosetting properties by which, upon removal of the solvent vehicle, an insoluble and infusible resinous condensation product is obtained. By the use of these features and proper control of the ratios of urea to urea derivatives employed in the reaction, the final product may be controlled to provide a solid resin or a viscous resinous condensation product.

These advantages are attained in the practice of the invention by condensing a mono-alkyl urea containing at least four carbon atoms in the alkyl radical simultaneously with formaldehyde and an unsubstituted saturated monohydric aliphatic alcohol containing between 3 and 8 carbon atoms. By this procedure, an intermediate condensation product is obtained in which the alkoxy radical of the alcohol is present, and this intermediate condensation product is soluble in various organic solvents, including the alcohol employed in the condensation, aromatic hydrocarbons, etc. This intermediate condensation product, in an appropriate solvent medium (such as an excess of the alcohol employed in the condensation) may then be combined with a product similarly derived from condensation of simple urea with formaldehyde and an unsubstituted saturated monohydric aliphatic alcohol containing between 3 and 8 carbon atoms. The combination of resultants so formed may be dissolved in an appropriate solvent and applied as a coating or in the manufacture of solid resins or viscous resins useful as adhesives, or plasticizers, merely by applying heat to effect removal of the aliphatic alcohol.

Products of condensation of unsubstituted saturated monohydric aliphatic alcohols containing between 3 and 8 carbon atoms with formaldehyde and simple urea are well known articles of commerce. When products of the present invention obtained by simultaneous condensation of an unsubstituted saturated monohydric aliphatic alcohol with an alkyl urea and formaldehyde are combined with these syrups, there is obtained a solution of these combined constituents which, by proper choice of the ratios of the two resultants employed, can be converted into a resinous condensation product of the desired consistency upon the application of heat.

While we do not wish to be limited by any theoretical reasoning by way of explanation of the results attained in the practice of the invention, it will be evident from the following theoretical discussion that the process of the invention is distinct, and produces a distinctive product, as compared with prior art processes in which an alkyl urea or an aliphatic alcohol is used alone to accomplish solubilization, and this theoretical discussion may be of assistance in facilitating understanding of the fundamental character of the invention.

When two molecules of urea react with one molecule of formaldehyde, a reaction occurs according to the following equation:

1. 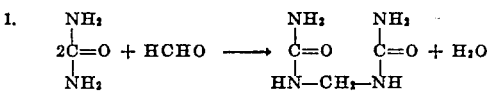

The resultant of Equation 1 may react in turn with a further molecule of urea and a molecule of formaldehyde as indicated by Equation 2:

2. 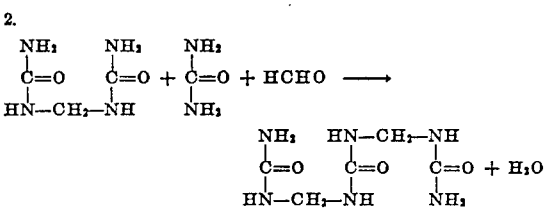

The NH₂ radicals of the resultant of Equation 2 may undergo further condensation with further molecules of formaldehyde and urea, and this process of combination and recombination may continue indefinitely, as the resulting molecule always contains two terminal NH₂ radicals capable of further combination with formaldehyde and urea. A molecule resulting from considerable further condensation is indicated at 3.

3. 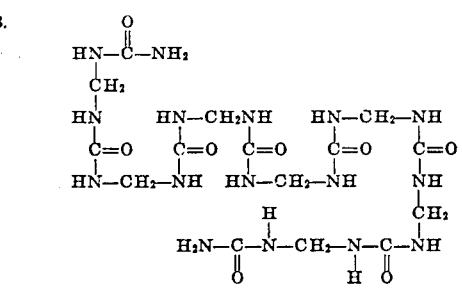

It is believed that the hardness of the resulting resin, and the tendency of the resin to become brittle and crack, are due to continued condensation to form a molecule of very great length.

The condensation reaction by which butyl urea (or other alkyl urea) is reacted with formaldehyde may be represented by Equation 4.

4. 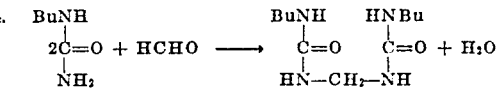

By contrasting Equation 4 with Equation 1, it will be seen that the resultants are distinguished by the fact that the terminal NH₂ radical of the resultant of Equation 1 is replaced by an NHBu radical in Equation 4. As a consequence of this fact the resultant of Equation 4 is much less reactive than that of Equation 1, and the molecular weights of products of this type of reaction are much smaller than those of repeated condensation of Equations 1 and 2. It is believed that this fact accounts for the distinctions between these two types of condensation products, such as the differences in solubility and physical condition, the condensation product of Equation 4 being a viscous liquid soluble in most organic solvents.

When a single molecule of urea and a single molecule of butyl urea react with formaldehyde, the reaction may be represented by Equation 5.

5.
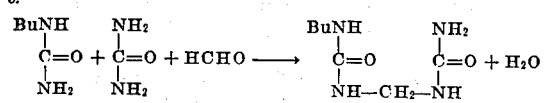

The $NH_2$ radical of the resultant of this equation may react with further formaldehyde and urea to produce a product of higher condensation, as illustrated by Equation 6.

6.
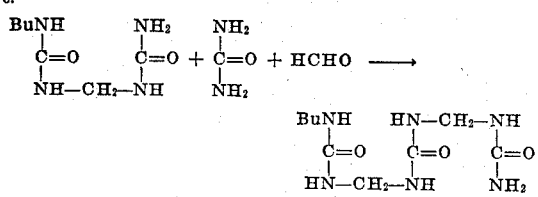

Alternatively, the resultant of Equation 5 may react with further formaldehyde and alkyl urea to produce the following compound.

7.
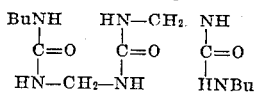

It will be seen that the resultant of Equation 6 is capable of further condensation, at the $NH_2$ radical, with further urea or alkyl urea, and that further condensation with urea produces a compound which is sufficiently reactive to undergo still further condensation with simple urea indefinitely. If, on the other hand, the resultant of Equation 5 is reacted with butyl urea, a compound such as indicated at 7 is produced, which contains no $NH_2$ radical, and hence cannot be readily reacted with formaldehyde and urea or butyl urea. Similarly, if at any stage of the cross condensation of formaldehyde with urea and butyl urea, formaldehyde and butyl urea are condensed with a resultant of a previous reaction which contains only a single $NH_2$ radical, the product of the last reaction will contain no such radical, with the result that it will be relatively unreactive. This is illustrated by Equation 8.

8.
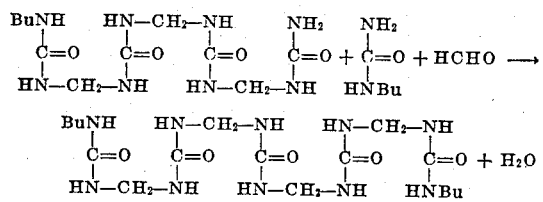

From the above discussion, it is apparent that, by cross-condensing formaldehyde with urea and butyl urea, products may be obtained of higher molecular weight and lower proportionate butyl radical content than that of Equation 4, but of lower molecular weight than those of condensation of simple urea with formaldehyde. The products of such cross-condensation may be made to vary in average molecular weight and solubility by varying the ratio of butyl urea to urea, higher proportions of butyl area giving more soluble and softer condensation products, of lower molecular weight. One difficulty with such cross-condensation products consists in the fact that, in order to obtain a product of the desired solubility in a particular solvent such as toluene, it is necessary to incorporate in the reaction mixture a proportion of alkyl urea which is so large as to form a product which may be undesirably soft or liquid.

It has heretofore been proposed that urea be reacted with formaldehyde and with an aliphatic alcohol to form a condensation product which may be dissolved in an organic solvent, such as an aromatic hydrocarbon or an alcohol, but which is rendered insoluble and infusible (thermoset) by the application of heat and removal of the solvent. The initial reaction by which the soluble resinous condensation product is formed may be represented by the following equation:

9.
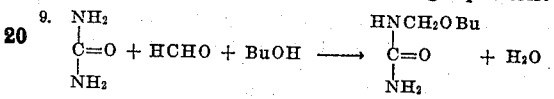

Two molecules of the resultant of Equation 9 may combine with each other upon application of heat, as follows:

10.
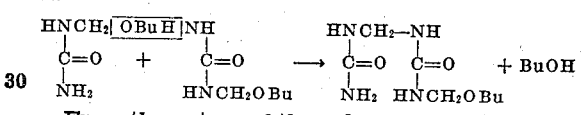

From the nature of the polymerization reaction of Equation 10, it will be evident that the $CH_2OBu$ radical of the resulting compound is capable of being further condensed with the $NH_2$ radical of the resultant of Equation 9 or 10, with elimination of an alcohol, and that the $NH_2$ radical of the product of Equation 10 is capable of being further condensed with the $CH_2OBu$ radical of the product of Equation 9 or 10. Since the resulting polymer has a $CH_2OBu$ radical and an $NH_2$ radical, regardless of the extent of polymerization, it will be seen that the polymerization reaction may continue indefinitely. It is believed that this indefinite continuation of polymerization is responsible for some of the undesirable qualities of this type of condensation product, as noted above.

It is believed that the condensation reactions of the present invention, while having an analogy to those illustrated above, are essentially distinct from any of them. Let us consider, for example, a simple reaction in which butyl urea, formaldehyde and butyl alcohol are condensed together, as represented by the following equation:

11.
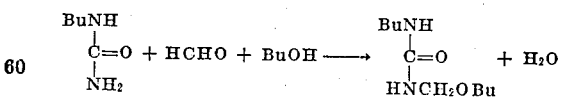

The resultant of Equation 11 is capable of being further condensed with the resultant of Equation 9 as follows:

12.
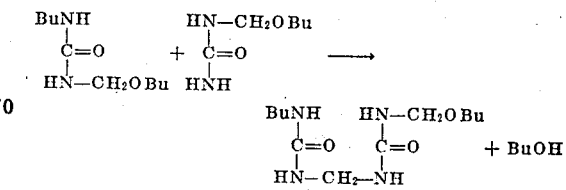

The product formed by the condensation reaction 12 may in turn be condensed with the product of Equation 11, or the product of Equation 9, since each of these products contains an alkoxy radical which may condense with an amido hydrogen and be removed in such condensation. Tendency to undergo further condensation of this kind is less marked, however, in the case of alkyl substituted amido groups, and the continuation of this chain of condensation reactions should accordingly provide compounds of substantially lower degrees of polymerization than would be obtained by condensation of products of Equation 9 where no compounds of the type formed by Equation 11 are present in the mixture.

By combining properly controlled proportions of the products of Equations 9 and 11, there are obtained products having characteristics as to solubility and physical conditions depending upon such control. For example, by combining equal parts by weight of the products of Equations 9 and 11, there may be obtained a product which is soluble in toluene and other organic solvent vehicles but which, upon elimination of the butoxy radicals and vehicle by application of heat, will provide a solid resin which is substantially softer than would be the product of similar application of heat to the product of Equation 9 if the product of Equation 11 were absent.

The products of Equations 9 and 11 are preferably dissolved in a suitable vehicle, such as toluene, before heat is applied to remove the butoxy radicals as indicated at 12. By dissolving these products in a suitable vehicle and combining them with resins, pigments, etc., there may be obtained, for example, a coating. In use of such a coating it is applied to the article to be coated and thereafter heated to cause the condensation reaction 12 and other more advanced condensation reactions to occur, and the vehicle to be removed, thereby providing a thermoset coating.

The invention has been described above in terms of condensing formaldehyde and an aliphatic alcohol with an alkyl urea in one operation and condensing formaldehyde and an aliphatic alcohol with simple urea in a separate operation before combining the products of these condensations. It is not essential, however, that the alkyl urea to be condensed with the formaldehyde and alcohol be entirely free of simple urea. For example, the invention may be practiced by co-condensation of the aliphatic alcohol and the formaldehyde with a mixture of alkyl urea and urea containing any amount of urea up to 30% by weight based on the total quantity of urea and alkyl urea present, to form a product which is not, of itself, capable of being thermoset. Such a product may be combined with the product of Equation 9 and this combination of constituents may be thermoset, provided there be a sufficient quantity of the product of Equation 9 present in the mixture.

It is also true that products of the type discussed above, which may be formed from mixtures of the alkyl urea with simple urea containing less than 30% of the simple urea, as aforesaid, may be combined with products which differ from the products of Equation 9 in that a certain amount of alkyl urea is combined with the simple urea of that equation. Thus, there may be formed on the one hand a condensation product of a mixture of alkyl urea and simple urea containing less than 30% of simple urea with formaldehyde and the alcohol (incapable of being thermoset), and there may be formed on the other hand a condensation product of a mixture of alkyl urea and simple urea containing more than 30% of simple urea with formaldehyde and the alcohol (and capable of being thermoset alone), and these two condensation products may be combined with each other and thermoset by the application of heat, provided the ratio of total quantity of urea to alkyl urea in the two preliminary condensation reactions be such that there is an adequate quantity of the product containing the larger proportion of simple urea in the blend. As a general rule, in the use of butyl and higher ureas and aliphatic alcohols containing from three to eight carbon atoms, there will be obtained a product incapable of being thermoset to produce a solid and hard resin so long as the ratio of urea to alkyl urea is less than 30:70. The products within this range formed by the condensation reactions of the invention serve as excellent modifying agents for products formed by the reaction of Equation 9.

It will be seen from the foregoing that, in the practice of the invention to form a thermosettable blend of condensation products, we are concerned with two separate initial condensation reactions and with a blending of the constituents of these two initial condensation reactions to form a thermosettable composition capable of yielding an ultimate product of the desired consistency upon the removal of alkoxy radicals. In the first preliminary reaction, a condensation product is formed from an alkyl urea or a mixture of urea and alkyl urea containing a quantity of alkyl urea so high as to yield a non-thermosettable product. In the second preliminary reaction, simple urea or a mixture of simple urea with alkyl urea is condensed to form a product containing a sufficient proportion of the simple urea to provide a thermosettable product. The products of these two preliminary reactions are then combined with each other in such ratio that, when these two products are condensed together by heating, the ultimate product is thermoset. As a general rule, the sum of the weights of urea employed in the two preliminary reactions should bear a ratio in excess of 30:70 to the sum of the alkyl urea constituents used in these two preliminary reactions to provide products which, when blended, can be thermoset to yield the desired ultimate condensation product.

While we have referred to the use of butanol and butyl urea in the foregoing discussion, it should be pointed out that other unsubstituted saturated monohydric aliphatic alcohols containing from 3 to 8 carbon atoms may be substituted for the butanol, and that other alkyl ureas containing at least 4 carbon atoms in the alkyl radical may be substituted for the butyl urea. Alkyl ureas containing from four to twelve carbon atoms in the alkyl radical are preferred.

From Equations 9 and 11, it will be evident that the amount of unsubstituted saturated monohydric aliphatic alcohol present in the initial condensation reactions should be at least sufficient to provide a stoichiometric equivalent of the urea constituents to be condensed with formaldehyde and this alcohol. It is preferable that a somewhat greater amount of aliphatic alcohol than this be provided, and in most cases the amount of aliphatic alcohol present in the reaction mixture will be in excess, on a weight basis, of the urea constituents entering into the preliminary condensation reactions.

In the preferred practice of the invention in formation of the preliminary condensation products, the urea constituent or mixture is first condensed with aqueous formaldehyde in the presence of an acid or alkaline catalyst. The reaction mixture may, for example, be subjected to preliminary reaction in the presence of acetic acid as a catalyst, and the aliphatic alcohol employed may be included in the reaction mixture at the beginning of the reaction, or may be introduced after partial condensation has occurred. For example, butyl urea and formaldehyde may be heated with the aliphatic alcohol, the water of reaction being progressively removed until an essentially anhydrous product is obtained. The product can then be combined with the other urea derivative condensation product similarly produced, with which it is to be blended and additional solvent may be added if desired. The resulting precondensate blend has a high aromatic hydrocarbon tolerance and may be stored for long periods of time without undergoing further condensation or other change. It may be converted to an insoluble, thermoset resin by the application of heat under conditions which permit evolution of the chemically bound aliphatic alcohol. Enhanced tolerance for toluene, etc., may sometimes be attained in the precondensate by subjecting the blended solution to additional heating in the presence of the alcohol.

The following examples illustrate the practice of the invention:

Example I 348 parts of butylurea, 486 parts of 37% formaldehyde, 296 parts of butyl alcohol, 10 parts of glacial acetic acid and 50 parts of xylene (to facilitate the azeotropic removal of water) were introduced into a three liter flask equipped with a stirrer, thermometer well and a refluxing decanter. The temperature of the reactants was gradually increased to 110° C. over a period of one hour, water being progressively removed from the decanter and the other vaporized components (chiefly butanol and xylene) being returned to the reaction vessel. The resulting product amounted to 795 parts and was found to be soluble in aromatic hydrocarbons and compatible with nitrocellulose and other resins. Films baked for two hours at 105° C. were soft and tacky.

Example II 972 parts formaldehyde (37%), 444 parts n-butanol, 10 parts glacial acetic acid and 25 parts xylene were charged into a flask equipped with a stirrer, thermometer well and reflux condenser. The mixture was heated to 85° C., and 180 parts of urea added in small quantities, allowing each portion to yield a clear solution before additional quantities were added. The water was removed azeotropically until the temperature reached 110° C. 802 parts of clear, water-white product containing 50.35% solids remained in the flask. Films .003 of an inch thick cast from this resin solution and baked 2 hrs. at 105° C., were extremely hard and brittle.

Example III 50 parts by weight (on a solids basis) of each of the precondensate products of Examples I and II were introduced into the apparatus previously described. The temperature was then raised to 119° C. thereby causing the elimination of about 0.5 cc. of water. The resulting product was found to be clear, stable and to have a toluene tolerance of 500%. Baked films were thermoset and, though hard and mar-proof, could be flexed without cracking.

Example IV 70 parts of commercial syrup comprising a condensation product of urea, formaldehyde, and monohydric aliphatic alcohol (containing 50% solids) and 26.3 parts of the butylurea precondensate of Example I (containing 60% solids) were blended together at room temperature. A .003 inch film of the blend was cast on a glass panel and was converted, by baking for one hour at 140° C., into a hard, thermoset, clear coating which was not affected by toluene.

Example V 459 parts of aqueous formaldehyde, 209 parts of butanol, 5 parts of acetic acid, 20 parts of xylene and 15 parts of butylurea were assembled in a similar apparatus, and heated to 85° C. 85 parts of urea were then added in increments, allowing each portion to react before additional quantities were added. 395 parts of water were removed azeotropically. The 370 parts of product remaining was a clear, viscous syrup and contained 60.6% solids. Films baked two hours at 105° C. were found to be hard but less brittle than those of Example II.

Example VI 85 parts of butylurea, 202 parts of formaldehyde, 222 parts butanol, 20 parts of xylene and 5 parts glacial acetic acid were assembled and heated to 85° C. Then 15 parts of urea were added. The reactants were processed in a manner similar to that of Example I until the temperature reached 119° C. 155 parts of water were removed and 398 parts of resin syrup were recovered. By analysis the product contained 41.6% solids and was soluble in aromatic hydrocarbons and compatible with nitrocellulose and other resins. Baked films were soft and tacky.

Example VII 70 parts of the precondensate product of Example V and 30 parts of that of Example VI were blended together in the presence of 1 part of lactic acid. Films of the resulting solution were cast on glass plates and were resinified by baking for 2 hours at 105° C. to give insoluble, thermoset coatings which were hard but not brittle.

Example VIII

The octylurea was prepared by reacting 645.8 parts of octylamine with 420 parts urea (2 moles excess) for 2 hours at 140–145° C. At the end of the reaction period (when ammonia ceased evolving) the mass was poured into cold water and filtered. The unreacted urea was removed by washing in water and the product dried under vacuum. 170 parts of the octylurea, 243 parts of formaldehyde, 250 parts butyl alcohol, 20 parts of xylene and 5 parts of acetic acid were assembled in a round bottom glass flask and heated while stirring until the temperature reached 85° C., when 30 parts of urea were added. The water was removed azeotropically until the temperature reached 119° C. 285 parts of water were collected. 419 parts of clear, viscous product were recovered. Baked films from this resin were soft, tacky and water resistant.

Example IX 70 parts of commercial syrup comprising a condensation product of urea, formaldehyde, and monohydric aliphatic alcohol (containing 50% solids), 28.8 parts of the precondensate of Example VIII (containing 52.2% solids) and 1 part of lactic acid were blended together. A film of the resulting solution was cast on glass and was baked for 1 hour at 150° C. The coating thus formed was found to be clear, water-white, tough and insoluble in toluene.

Various modifications are available within the scope of the invention, and we therefore do not wish to be limited except by the scope of the following claims.

We claim:

1. In the manufacture of improved thermosettable condensation products of the urea-formaldehyde type, the process comprising blending together a product obtained by heating in the presence of a catalyst, a mixture comprising a monoalkyl urea containing from 4 to 12 carbon atoms in the alkyl radical, at least an equal weight of an unsubstituted saturated monohydric aliphatic alcohol containing from 3 to 8 carbon atoms and formaldehyde, with a second product obtained by heating, in the presence of a catalyst, urea, at least an equal weight of an unsubstituted saturated monohydric aliphatic alcohol containing from 3 to 8 carbon atoms and formaldehyde, the proportion of said first product to said second product in the blend being less than that required to provide a 7:3 weight ratio of alkylurea to urea entering into the two products of the blend, but sufficient to impart a desired degree of plasticization to the thermoset resin derivable from said blend upon heating.

2. The process of claim 1 in which the monohydric alcohol, in each instance, is butanol.

3. The process of claim 1 in which the alkylurea is butyl urea.

4. The process of claim 3 in which the monohydric alcohol is, in each instance, butanol.

5. In the manufacture of condensation products by reaction of urea and urea derivatives with formaldehyde, the process comprising applying heat to condense together in the presence of a catalyst a monoalkyl urea containing at least four but not more than twelve substituent carbon atoms in the alkyl radical, an unsubstituted saturated monohydric aliphatic alcohol containing between 3 and 8 carbon atoms inclusive, and formaldehyde, applying heat in a separate reaction to condense together in the presence of a catalyst urea, an unsubstituted saturated monohydric aliphatic alcohol containing between 3 and 8 carbon atoms inclusive, and formaldehyde, and combining the products of said first-mentioned condensation reaction and said second-mentioned condensation reaction, the amount of alcohol entering into the combined products being sufficient to provide at least a stoichiometric equivalent of the total of the urea constituents employed, and the proportion by weight of urea to alkyl urea employed in producing said final product being in excess of 30 to 70.

6. In the manufacture of condensation products by reaction of urea and urea derivatives with formaldehyde, the process comprising applying heat to condense together in the presence of a catalyst a monoalkyl urea containing at least four but not more than twelve substituent carbon atoms in the alkyl radical, an unsubstituted saturated monohydric aliphatic alcohol containing between 3 and 8 carbon atoms inclusive, and formaldehyde, the amount of said alcohol present being sufficient to provide at least a stoichiometric equivalent of the monoalkyl urea present, applying heat in a separate reaction to condense together in the presence of a catalyst urea, an unsubstituted saturated monohydric aliphatic alcohol containing between 3 and 8 carbon atoms inclusive, and formaldehyde, the amount of said last-mentioned alcohol being sufficient to provide at least a stoichiometric equivalent of the urea present, combining the products of said first-mentioned condensation reaction and said second-mentioned condensation reaction, and applying heat to said combined reaction products to remove monohydric aliphatic alcohol from said combined reaction products, the proportion by weight of urea to alkyl urea employed in producing said final product being in excess of 30 to 70.

7. In the manufacture of condensation products by reaction of urea and urea derivatives with formaldehyde, the process comprising condensing together with the application of heat and with the aid of a catalyst a monoalkyl urea containing at least four but not more than twelve substitutent carbon atoms in the alykl radical, urea, an unsubstituted saturated monohydric aliphatic alcohol containing between 3 and 8 carbon atoms inclusive, and formaldehyde, the weight ratio of urea to alkyl urea being less than 3:7, separately condensing together with the application of heat and with the aid of a catalyst urea, an unsubstituted saturated monohydric aliphatic alcohol containing between 3 and 8 carbon atoms inclusive, and formaldehyde, and combining the products of said first-mentioned condensation reaction and said second-mentioned condensation reaction, the amount of alcohol entering into the combined products being sufficient to provide at least a stoichiometric equivalent of the total of the urea constituents employed, and the proportion by weight of urea to alkyl urea employed in producing said final product being in excess of 30 to 70.

8. In the manufacture of condensation products by reaction of urea and urea derivatives with formaldehyde, the process comprising condensing together with the application of heat and with the aid of a catalyst a monoalkyl urea containing at least four but not more than twelve substituent carbon atoms in the alkyl radical, urea, an unsubstituted saturated monohydric aliphatic alcohol containing between 3 and 8 carbon atoms inclusive, and formaldehyde, the weight ratio of urea to alkyl urea being less than 3:7, and the amount of said alcohol present being sufficient to provide at least a stoichiometric equivalent of the total of the urea constituents present, separately condensing together with the application of heat and with the aid of a catalyst urea, an unsubstituted saturated monohydric aliphatic alcohol containing between 3 and 8 carbon atoms inclusive, and formaldehyde, the amount of said last-mentioned alcohol present in said second-mentioned condensation reaction being sufficient to provide at least a stoichiometric equivalent of the total of urea present therein, combining the products of said first-mentioned condensation reaction and said second-mentioned condensation reaction, and applying heat to said combined reaction products to remove monohydric aliphatic alcohol from said combined reaction products, the proportion by weight of urea to alkyl urea employed in producing said final product being in excess of 30 to 70.

9. In the manufacture of condensation products by reaction of urea and urea derivatives with formaldehyde, the process comprising applying heat and a catalyst to condense together a monoalkyl urea containing at least four but not more than twelve substituent carbon atoms in the alkyl radical, urea, an unsubstituted saturated monohydric aliphatic alcohol containing between 3 and 8 carbon atoms inclusive, and formaldehyde, the weight ratio of urea to alkyl urea being less than 3:7, separately condensing together with the application of heat and the aid of a catalyst in a second reaction a monoalkyl urea containing at least 4 but not more than twelve substituent carbon atoms in the alkyl radical, urea, an unsubstituted saturated monohydric aliphatic alcohol containing between 3 and 8 carbon atoms inclusive, and formaldehyde, the weight ratio of urea to alkyl urea in this second condensation reaction being greater than 3:7, and combining the products of said first-mentioned condensation reaction and said second-mentioned condensation reaction, the amount of alcohol entering into said combined products being sufficient to provide at least a stoichiometric equivalent of the total of urea constituents employed, and the proportion by weight of urea to alkyl urea employed in producing said final product being in excess of 30 to 70.

10. In the manufacture of condensation products by reaction of urea and urea derivatives with formaldehyde, the process comprising applying heat and a catalyst to condense together a monoalkyl urea containing at least four but not more than twelve substituent carbon atoms in the alkyl radical, urea, an unsubstituted saturated monohydric aliphatic alcohol containing between 3 and 8 carbon atoms inclusive, and formaldehyde, the weight ratio of urea to alkyl urea being less than 3:7, and the amount of said alcohol present being sufficient to provide at least a stoichiometric equivalent of the total of the urea constituents present, separately condensing together wtih the application of heat and with the aid of a catalyst in a second reaction a monoalkyl urea containing at least 4 but not more than twelve substituent carbon atoms in the alkyl radical, urea, an unsubstituted saturated monohydric aliphatic alcohol containing between 3 and 8 carbon atoms inclusive, and formaldehyde, the weight ratio of urea to alkyl urea in this second condensation reaction being greater than 3:7, and the amount of said last-mentioned alcohol present in said second condensation reaction being sufficient to provide at least a stoichiometric equivalent of the total of the urea constituents present therein, combining the products of said first-mentioned condensation reaction and said second-mentioned condensation reaction, and applying heat to said combined reaction products to remove monohydric aliphatic alcohol from said combined reaction products, the proportion by weight of urea to alkyl urea employed in producing said final product being in excess of 30 to 70.

11. The product of the process of claim 1.

JOHN F. OLIN.
PAUL D. MORTON.

REFERENCES CITED

The following references are of record in the file of this patent:

UNITED STATES PATENTS

| Number | Name | Date |
|---|---|---|
| 2,171,882 | Ludwig | Sept. 5, 1939 |
| 2,191,957 | Edgar et al. | Feb. 27, 1940 |
| 2,273,788 | Olin | Feb. 17, 1942 |
| 2,315,745 | Sorenson | Apr. 6, 1943 |
| 2,317,181 | D'Alelio | Apr. 20, 1943 |
| 2,403,450 | Morton et al. | July 9, 1946 |